United States Patent [19]

Harpell et al.

[11] Patent Number: 4,613,535

[45] Date of Patent: Sep. 23, 1986

[54] COMPLEX COMPOSITE ARTICLE HAVING IMPROVED IMPACT RESISTANCE

[75] Inventors: Gary A. Harpell, Morristown; Igor Palley, Madison; Dusan C. Prevorsek, Morristown, all of N.J.

[73] Assignee: Allied Corporation, Morris Township, Morris County, N.J.

[21] Appl. No.: 707,010

[22] Filed: Feb. 28, 1985

[51] Int. Cl.[4] .................................................. B32B 5/12
[52] U.S. Cl. ........................................ 428/113; 2/2.5; 428/224; 428/246; 428/252; 428/284; 428/286; 428/289; 428/295; 428/364; 428/365; 428/378; 428/382; 428/392; 428/395; 428/902; 428/911
[58] Field of Search ................... 2/2.5; 428/246, 252, 428/284, 286, 289, 260, 263, 457, 492, 902, 911, 113, 295, 378, 382, 392, 395

[56] References Cited

U.S. PATENT DOCUMENTS

| | | | |
|---|---|---|---|
| 4,403,012 | 9/1983 | Harpell et al. | 428/911 |
| 4,413,110 | 11/1983 | Kavesh et al. | 526/348.1 |
| 4,428,998 | 1/1984 | Hawkinson | 428/911 |
| 4,457,985 | 7/1984 | Harpell et al. | 428/911 |

OTHER PUBLICATIONS

"The Effect of Resin Concentration and Laminating Pressures on KEVLAR Fabric Bonded with Modified Phenolic Resin," *Technical Report* WATICK/TR-84-030 Jun. 8, 1984.

*Primary Examiner*—James J. Bell
*Attorney, Agent, or Firm*—Gus T. Hampilos; Gerard H. Fuchs

[57] ABSTRACT

The present invention provides an improved, complex composite article of manufacture which comprises a network of high strength fibers having a tensile modulus of at least about 160 grams/denier and a tenacity of at least about 7 g/denier. An elastomeric matrix material substantially coats each of the individual fibers, and has a tensile modulus of less than about 6,000 psi, measured at 25° C. The fibers in the matrix are provided with at least one additional rigid layer on a major surface of the fibers in the matrix to produce a rigid complex composite. Composites of this construction have improved resistance to environmental hazards, improved impact resistance, and are unexpectedly effective as ballistic resistant articles such as armor or helmets.

35 Claims, No Drawings

COMPLEX COMPOSITE ARTICLE HAVING IMPROVED IMPACT RESISTANCE

BACKGROUND OF THE INVENTION

Ballistic articles such as bulletproof vests, helmets, armor plate, and other military equipment, structural members of helicopters, aircraft, ships, and vehicle panels and briefcases containing high strength fibers are known. Fibers conventionally used include aramid fibers, fibers such as poly(phenylenediamine terephthalamide), graphite fibers, ceramic fibers, nylon fibers, glass fibers and the like. For these applications, the fibers are ordinarily encapsulated or embedded in a rigid matrix material and, in some instances, are joined with rigid facing layers to form complex composite structures.

U.S. Pat. No. 4,403,012 and U.S. Pat. No. 4,457,985 disclose ballistic-resistant composite articles comprised of networks of ultra-high molecular weight polyethylene or polypropylene fibers in matrices composed of olefin polymers and copolymers, unsaturated polyester resins, epoxy resins, and other resins curable below the melting point of the fiber. While such composites provide effective ballistic resistance, A. L. Lastnik, et al.; "The Effect of Resin Concentration and Laminating Pressures on KEVLAR ® Fabric Bonded with Modified Phenolic Resin", Technical Report NATICK/TR84/030, June 8, 1984, has disclosed that an interstitial resin, which encapsulates and bonds the fibers of a fabric, reduces the ballistic resistance of the resultant composite article. Therefore, a need exists to improve the structure of composites to effectively utilize the properties of the high strength fibers.

U.S. Pat. application Ser. No. 691,048, Harpell et al., filed Jan., 14, 1985, and commonly assigned, discloses a simple composite comprising high strength fibers embedded in an elastomeric matrix. Surprisingly, the simple composite structure exhibits outstanding ballistic protection as compared to sample composites utilizing rigid matrices, the results of which are disclosed therein. Particularly effective are simple composites employing ultra-high molecular weight polyethylene and polypropylene such as disclosed in U.S. Ser. No. 4,413,110. However, the simple composites, because of the use of a low modulus elastomeric matrix, may not be suitable in some applications where, for example, rigidity, surface hardness, chemical resistance or heat resistance may be very important.

We have discovered complex composite structures which do not compromise the advantageous properties of a simple composite formed of fibers in a low modulus elastomeric matrix while providing the requisite rigidity, surface hardness, chemical resistance or heat resistance, etc., needed for certain applications. Moreover, complex composite structures of this invention are unexpectedly superior to the simple composite in ballistic protection (at equal weight).

BRIEF DESCRIPTION OF THE INVENTION

The present invention is directed to a complex composite article of manufacture having improved rigidity and, in many instances, improved resistance to environmental hazards which comprises a network of high strength fibers having a tensile modulus of at least about 160 grams/denier and a tenacity of at least about 7 grams/denier in an elastomeric matrix material having a tensile modulus of less than about 6,000 psi (measured at 25° C.), in combination with at least one additional layer arranged on a major surface of the network in the elastomeric matrix material to form a structurally rigid, complex composite article.

The present invention is also drawn to a complex composite article of manufacture having improved rigidity and, in many instances, improved resistance to environmental hazards which comprises a network of high strength fibers having a tensile modulus of at least about 160 grams/denier and a tenacity of at least about 7 grams/denier in an elastomeric matrix material having a tensile modulus of less than about 6,000 psi, (measured at 25° C.) in combination with at least one additional layer arranged on a major surface of the network in the elastomeric matrix material adjacent the initial impact side of the network in the elastomeric matrix is provided to form a structurally rigid, complex composite article capable of effectively absorbing the energy of a projectile.

The present invention also provides a complex composite article of manufacture having improved rigidity and, in many instances, improved resistance to environmental hazards which comprises a network of high strength fibers having a tensile modulus of at least about 500 grams/denier and a tenacity of at least about 15 grams/denier in an elastomeric matrix material having a tensile modulus of less than about 6,000 psi, (measured at 25° C.) in combination with at least one additional layer arranged on a major surface of the network in the elastomeric matrix material adjacent the initial impact side of the network in the elastomeric matrix is provided to form a structurally rigid complex ballistic resistant composite article.

Compared to conventional impact-resistant structures, and in particular to ballistic resistant armor, composite article of the present invention can advantageously provide a selected level of impact protection while employing a reduced weight of protective material. Alternatively, the composite article of the present invention can provide increased impact protection when the article has a weight equal to the weight of a conventionally constructed composite such as composite armor.

DETAILED DESCRIPTION OF THE INVENTION

For the purposes of the present invention, fiber is an elongate body the length dimension of which is much greater than the transverse dimensions of width and thickness. Accordingly, the term fiber includes monofilament fiber, multifilament fiber, ribbon, strip, a plurality of any one or combinations thereof and the like having regular or irregular cross-section.

Complex composite articles of the present invention include a fiber network comprising highly oriented ultra-high molecular weight polyethylene fiber, highly oriented ultra-high molecular weight polypropylene fiber, aramid fiber, polyvinyl alcohol fiber or combinations thereof. U.S. Pat. No. 4,457,985 generally discusses such oriented ultra high molecular weight polyethylene and polypropylene fibers, the disclosure of which is hereby incorporated by reference to the extent not inconsistent herewith. In the case of polyethylene, suitable fibers are those highly orientated fibers of weight average molecular weight of at least about 500,000, preferably at least about one million and more preferably between about two million and about five million. Known as extended chain polyethylene (ECPE) fibers, such fibers may be produced from polyethylene solution spinning processes described, for example, in U.S. Pat. No. 4,137,394 to Meihuzen et al. or U.S. Pat. No. 4,356,138 to Kavesh et al., or spun from a solution to form a gel structure as described in German Off. No. 3,004,699, GB No. 2051667, and especially as described in application Ser. No. 259,266 of Kavesh et al. filed Apr. 30, 1981 and application Ser. No. 359,019 (continuation-in-part of Ser. No. 259,266) (see EPA No. 64,167, published Nov. 10, 1982). As used herein, the term polyethylene shall mean a predominantly linear polyethylene material that may contain minor amounts of chain branching or comonomers not exceeding 5 modifying units per 100 main chain carbon atoms, and that may also contain admixed therewith not more than about 25 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated therewith. Depending upon the fiber-forming technique, the draw ratio and temperatures, and other conditions, a variety of properties can be imparted to these fibers. The tenacity of the fibers is ordinarily at least about 15 grams/ denier, preferably at least about 20 grams/denier, more preferably at least about 25 grams/denier and most preferably at least about 30 grams/denier. Similarly, the tensile modulus of the fibers, as measured by an Instron tensile testing machine, is ordinarily at least about 300 grams/denier, preferably at least about 500 grams/denier, more preferably at least about 1,000 grams/denier and most preferably at least about 1,500 grams/denier. These highest values for tensile modulus and tenacity are generally obtainable only by employing solution spun or gel fiber processes. In addition, many ECPE fibers have melting points higher than the melting point of the polymer from which they were formed. Thus, for example, whereas ultra-high molecular weight polyethylenes of 500,000, one million and two million generally have melting points in the bulk of 138° C., the ECPE fibers made of these materials have melting points 7° 14 13° C. higher. The increase in melting point reflect a higher crystalline orientation of the fibers as compared to the bulk polymer. Notwithstanding the contrary teachings in the prior art, improved ballistic resistant articles are formed when polyethylene fibers having a weight average molecular weight of at least about 500,000, a modulus of at least about 500 and a tenacity of at least about 15 g/denier are employed. Cf. John V. E. Hansen and Roy C. Laible in "Flexible Body Armor Materials," Fiber Frontiers ACS Conference, June 10-12, 1974 (ballistically resistent high strength fibers must exhibit high melting point and high resistance to cutting or shearing); Roy C. Laible, *Ballistic Materials and Penetration Mechanics*, 1980 (noting that nylon and polyester may be limited in their ballistic effectiveness due to the lower melting point); and "The Application of High Modulus Fibers to Ballistic Protection", R. C. Laible, et al., J. Macromel. Sci. Chem., A7(1), pp. 295-322, 1973 (the importance of a high degree of heat resistance is again discussed).

In the case of polypropylene, highly oriented polypropylene fibers of weight average molecular weight at least about 750,000, preferably at least about one million and more preferably at least about two million may be used. Ultra high molecular weight polypropylene may be formed into reasonably highly oriented fibers by the techniques prescribed in the various references referred to above, and especially by the technique of U.S. Ser. No. 259,266, filed Apr. 30, 1981, and the continuations-in-part thereof, both to Kavesh et al. and commonly assigned. Since polypropylene is a much less crystalline material than polyethylene and contains pendant methyl groups, tenacity values achievable with polypropylene are generally substantially lower than the corresponding values for polyethylene. Accordingly, a suitable tenacity is at least about 8 grams/denier, with a preferred tenacity being at least about 11 grams/denier. The tensile modulus for polypropylene is at least about 160 grams/denier, preferably at least about 200 grams/denier. The melting point of the polypropylene is generally raised several degrees by the orientation process, such that the polypropylene fiber preferably has a main melting point of at least about 168° C., more preferably at least about 170° C. Employing fibers having a weight average molecular weight of at least about 750,000 coupled with the preferred ranges for the above-described parameters (modulus and tenacity) can provide advantageously improved performance in the final article especially in ballistic resistant articles, notwithstanding the contrary teachings in the prior art). C.f. Laible, *Ballistic Materials and Penetration Mechanics*, supra, at p. 81 (no successful treatment has been developed to bring the ballistic resistance of polypropylene up to levels predicated from the yarn stress-strain properties); and The relative effectiveness of NTIS publication ADA018 958, "New Materials in Construction for Improved Helmets", A. L. Alesi et al. [wherein a multilayer highly oriented polypropylene film material (without matrix), referred to as "XP", was evaluated against an aramid fiber (with a phenolic/polyvinyl butyral resin matrix); the aramid system was judged to have the most promising combination of superior performance and a minimum of problems for combat helmet development].

Aramid fiber is formed principally from the aromatic polyamide. Aromatic polyamide fibers having a modulus of at least about 400 g/denier and tenacity of at least about 18 g/denier are useful for incorporation into composites of this invention. For example, poly(phenylenediamine terephalamide) fibers produced commercially by Dupont Corporation under the trade name of Kevlar ® 29 and 49 and having moderately high moduli and tenacity values are particularly useful in forming ballistic resistant composites. (Kevlar ® 29 has 500 g/denier and 22 g/denier and Kevlar ® 49 has 1000 g/denier and 22 g/denier as values of modulus and tenacity, respectively).

In the case of polyvinyl alcohol (PV-OH), PV-OH fibers having a weight average molecular weight of at least about 500,000, preferably at least about 750,000, more preferably between about 1,000,000 and about 4,000,000 and most preferably between about 1,500,000 and about 2,500,000 may be employed in the present invention. Usable fibers should have a modulus of at least about 160 g/denier, preferably at least about 200 g/denier, more preferably at least about 300 g/denier, and a tenacity of at least about 7 g/denier, preferably at least about 10 g/denier and more preferably at least about 14 g/denier and most preferably at least about 17 g/denier. PV-OH fibers having a weight average molecular weight of at least about 500,000, a tenacity of at least about 200 g/denier and a modulus of at least about 10 g/denier are particularly useful in producing ballistic resistant composites. PV-OH fibers having such properties can be produced, for example, by the process disclosed in U.S. Pat. application Ser. No. 569,818, filed Jan. 11, 1984, to Kwon et al. and commonly assigned.

In the complex composite articles of our invention, the fibers may be arranged in networks having various configurations. For example, a plurality of fibers can be grouped together to form a twisted or untwisted yarn. The fibers or yarn may be formed as a felt, knitted, woven (plain, basket, satin and crow feet weaves, etc.), fabricated into non-woven fabric, arranged in parallel array, layered or formed into a fabric in any of a variety of conventional techniques. Among these techniques, for ballistic resistance we prefer to use those variations commonly employed in the preparation of aramid fabrics for ballistic-resistant articles. For example, the techniques described in U.S. Pat. No. 4,181,768 and in M. R. Silyquist et al. *J. Macromol Sci. Chem.*, A7(1), pp. 203 et. seq. (1973) are particularly suitable.

The fibers or fabrics may be premolded by subjecting them to heat and pressure. For ECPE fibers, molding temperatures range from about 20°–155° C., preferably from about 80°–145° C., more preferably from about 100°–135° C., and more preferably from about 110°–130° C. The pressure may range from about 10 psi to about 10,000. A pressure between about 10 psi and about 100 psi, when combined with temperatures below about 100° C. for a period of time less than about 0.5 min., may be used simply to cause adjacent fibers to stick together. Pressures from about 100 psi to about 10,000 psi, when coupled with temperatures in the range of about 150°–155° C. for a time of between about 1–5 min., may cause the fibers to deform and to compress together (generally in a film-like shape). Pressures from about 100 psi to about 10,000 psi, when coupled with temperatures in the range of about 150°–155° C. for a time of between 1–5 min., may cause the film to become translucent or transparent. For polypropylene fibers, the upper limitation of the temperature range would be about 10°–20° C. higher than for ECPE fiber.

The fibers (premolded if desired) may be precoated with a polymeric material comprising the elastomer prior to being arranged in a network as described above. The low modulus elastomeric material has a tensile modulus, measured at about 23° C., of less than about 6,000 psi (41,400 kPa). Preferably, the tensile modulus of the elastomer is less than about 5,000 psi (34,500 kPa), and most preferably is less than about 2,500 (17,250 kPa) to provide even more improved performance. The glass transition temperature (Tg) of the elastomer (as evidenced by a sudden drop in the ductility and elasticity of the material) should be less than about 0° C. Preferably, the Tg of the elastomer is less than about −40° C., and more preferably is less than about −50° C. The elastomer should have an elongation to break of at least about 50%. Preferably, the elongation to break is at least about 100%, and more preferably, it is about 300% for more superior performance.

A wide variety of elastomeric materials and formulations may be utilized in this invention. Representative examples of suitable elastomers have their structures, properties, and formulations together with crosslinking procedures summarized in the *Encyclopedia of Polymer Science*, Volume 5, "Elastomers-Synthetic" (John Wiley & Sons Inc., 1964). The essential requirement is that the matrix materials of this invention have appropriately low moduli as noted above. For example, any of the following materials may be employed: polybutadiene, polyisoprene, natural rubber, ethylene-propylene copolymers, ethylenepropylene-diene terpolymers, polysulfide polymers, polyurethane elastomers, chlorosulfonated polyethylene, polychloroprene, plasticized polyvinylchloride using dioctyl phthalate or other plasticers well known in the art, butadiene acrylonitrile elastomers, poly(isobutylene-co-isoprene), polyacrylates, polyesters, polyethers, fluoroelastomers, silicone elastomers, thermoplastic elastomers, copolymers of ethylene.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type (AB)n(n=2–10) or radial configuration copolymers of the type R-(BA)x(x-=3–150); wherein A is a block from a polyvinyl aromatic monomer and B is a block from a conjugated diene elastomer. Many of these polymers are produced commercially by the Shell Chemical Co. and described in the bulletin "Kraton Thermoplastic Rubber", SC-68-81.

The low modulus elastomeric material may be compounded with fillers such as carbon black, silica, glass microballoons, etc. up to an amount not to exceed about 300% by weight of elastomer, preferably not to exceed about 100% by weight, and may be extended with oils and vulcanized by sulfur, peroxide, metal oxide, or radiation cure systems using methods well known to rubber technologists of ordinary skill. Blends of different elastomeric materials may be used together or one or more elastomer materials may be blended with one or more thermoplastics. High density, low density, and linear low density polethylene may be cross-linked to obtain a material of appropriate properties, either alone or as blends.

The proportion of coating on the coated fibers or fabrics may vary from relatively small amounts (e.g. 1% by weight of fibers) to relatively large amounts (e.g. 150% by weight of fibers), depending upon whether the coating material has any impact or ballistic-resistant properties of its own (which is generally not the case) and upon the rigidity, shape, heat resistance, wear resistance, flammability resistance and other properties desired for the complex composite article. In general, ballistic-resistant articles of the present invention containing coated fibers should have a relatively minor proportion of coating (e.g., about 10–30 percent by weight of fibers), since the ballistic-resistant properties are almost entirely attributable to the fiber. Nevertheless, coated fibers with higher coating contents may be employed.

The coating may be applied to the fiber in a variety of ways. One method is to apply the resin of the coating material to the stretched high modulus fibers either as a liquid, a sticky solid or particles in suspension, or as a fluidized bed. Alternatively, the coating may be applied as a solution or emulsion in a suitable solvent which does not adversely affect the properties of the fiber at the temperature of application. While any liquid capable of dissolving or dispersing the coating polymer may be used, preferred groups of solvents include water, paraffin oils, ketones, alcohols, aromatic solvents or hydrocarbon solvents or mixtures thereof, with illustrative specific solvents including paraffin oil, xylene, toluene and octane. The techniques used to dissolve or disperse the coating polymers in the solvents will be those conventionally used for the coating of similar elastomeric materials on a variety of substrates.

Other techniques for applying the coating to the fibers may be used, including coating of the high modulus precursor before the high temperature stretching operation, either before or after removal of the solvent from the fiber. The fiber may then be stretched at elevated temperatures to produce the coated fibers. The extruded gel fiber may be passed through a solution of the appropriate coating polymer (solvent may be paraffin oil, aromatic or aliphatic solvent) under conditions to attain the desired coating. Crystallization of the high molecular weight polyethylene in the gel fiber may or may not have taken place before the fiber passes into the cooling solution. Alternatively, the fiber may be extruded into a fluidized bed of the appropriate polymeric powder.

Furthermore, if the fiber achieves its final properties only after a stretching operation or other manipulative process, e.g. solvent exchanging, drying or the like, it is contemplated that the coating may be applied to a precursor material of the final fiber. In such cases, the desired and preferred tenacity, modulus and other properties of the fiber should be judged by continuing the manipulative process on the fiber precursor in a manner corresponding to that employed on the coated fiber precursor. Thus, for example, if the coating is applied to the xerogel fiber described in U.S. application Ser. No. 259,266 and the Continuation-in-part thereof (application Ser. No. 357,020) of Kavesh et al., and the coated xerogel fiber is then stretched under defined temperature and stretch ratio conditions, then the fiber tenacity and fiber modulus values would be measured on uncoated xerogel fiber which is similarly stretched.

It has also been discovered that elastomer coated ECPE fiber, in which the aspect ratio (ratio of strip width to thickness) is at least about 5, unexpectedly can be even more effective than coated-filament yarn (generally circular cross section) when producing ballistic-resistant composites. In particular embodiments of the invention, the aspect ratio of the strip is at least 50, more preferably is at least 100 and most preferably is at least 150. Surprisingly, even though such ECPE fibers generally have significantly lower tensile properties than an ECPE yarn material produced under equivalent process conditions (generally produced from fibers having an aspect ratio of approximately 1), the ballistic resistance of the composite constructed from $\geq 5$ aspect ratio ECPE fiber is much higher than the ballistic resistance of a composite constructed from ECPE yarns.

It is a critical aspect of the invention that each fiber must be substantially coated with a polymeric material comprising a low modulus elastomeric material for the production of composites having improved impact protection. Moreover, it is a critical aspect of the invention that each filament of each fiber must be substantially coated with the low modulus elastomeric material to produce composites having maximum ballistic resistance. A fiber or filament is substantially coated by using any of the coating processes described above or can be substantially coated by employing any other process capable of producing a fiber or filament coated essentially to the same degree as a fiber or filament coated by the processes described heretofore.

The fibers and networks produced therefrom are formed into simple composite materials as the precursor to preparing the complex composite articles of the present invention. The term, simple composite, is intended to mean combinations of the ultra-high molecular weight fiber or fabric with a single major matrix material, which may include minor proportions of other materials such as fillers, lubricants or the like as noted heretofore.

When coated fibers and networks produced therefrom are employed, suitable matrix materials include polyethylenes, cross-linked polyethylenes, polypropylenes, ethylene copolymers, propylene copolymers and other olefin polymers and copolymers. Examples of such other matrix materials include unsaturated polyesters, phenolics, polybutyrals, epoxy resins and polyurethane resins and other low modulus resins ourable below the melting point of the fiber.

When uncoated fibers and networks produced therefrom are employed, the low modulus elastomeric materials discussed above are used as the coatings for each of the individual filaments of the fiber (or the network) and matrix materials to provide a composite having significantly improved impact resistance. As above, the elastomeric matrix material has a tensile modulus, measured at about 23° C., of less than about 6,000 psi (41,400 kPa). Preferably, the tensile modulus of the elastomer is less than about 5,000 psi (34,500 kPa), and more preferably is less than about 2,500 psi (17,250 kPa) to provide even more improved performance. Similarly, the glass transition temperature ($T_g$) of the elastomer (as evidenced by a sudden drop in the ductility and elasticity of the material) should be less than about 0° C. Preferably, the $T_g$ of the elastomer is less than about −40° C., and more preferably is less than about −50° C. The elastomer should have an elongation to break of at least about 50%. Preferably, the elongation to break is at least about 100%, and more preferably, it is about 300% for more superior performance. The individual filaments may be coated with the low modulus elastomer by employing known high pressure molding techniques. In the production of improved ballistic resistant composites, such known processes must be capable of substantially coating each filament.

The proportion of matrix material to fiber is variable for the simple composites, with matrix material amounts of from about 5% to about 150%, by weight of fibers, representing the broad general range. Within this range, it is preferred to use composites having a relatively high fiber content, such as composites having only 10-50% matrix material, by weight of fibers, and more preferably 10-30% matrix material.

Stated another way, the fiber network occupies different proportions of the total volume of the simple composite. Preferably, however, the fiber network comprises at least about 30 volume percent of the simple composite. For ballistic protecting, the fiber network comprises at least about 50 volume percent, more preferably between about 70 volume percent, and most preferably at least about 75 volume percent, with the matrix occupying the remaining volume.

A particularly effective technique for preparing a preferred, simple composite prepreg comprised of substantially parallel, unidirectionally aligned fibers includes the steps of pulling a high modulus fiber through a bath containing a solution of the elastomeric material, and helically winding this fiber into a single sheet-like layer around and along the length of a suitable form, such as a cylinder. The solvent is then evaporated leaving a prepreg sheet that can be removed from the cylindrical form. Alternatively, a plurality of fibers can be simultaneously pulled through the bath of elastomer solution and laid down in closely positioned, substantially parallel relation to one another on a suitable surface. Evaporation of the solvent leaves a prepreg sheet comprised of elastomer coated fibers which are substantially parallel and aligned along a common fiber direction. The sheet is suitable for subsequent processing and laminating.

Similarly, a yarn-type simple composite can be produced by pulling a group of filaments through the solution of elastomeric material to substantially coat each of the individual filaments, and then evaporating the solvent to form the coated yarn. The yarn can then, for example, be employed to form fabrics, which in turn, can be used to form desired complex composite structures. Moreover, the coated yarn can also be processed into a simple composite by employing conventional filament winding techniques; for example, the simple composite can have coated yarn formed wound into overlapping fiber layers.

Simple composite materials may be constructed and arranged in a variety of forms. It is convenient to characterize the geometries of such composites by the geometries of the fibers and then to indicate that the matrix material may occupy part or all of the void space left by the network of fibers. One such suitable arrangement is a plurality of layers or laminates in which the coated fibers are arranged in a sheet-like array and aligned parallel to one another along a common fiber direction. Successive layers of such coated, undirectional fibers can be rotated with respect to the previous layer. An example of such laminate structures are composites with the second, third, fourth and fifth layers rotated +45°, −45°, 90° and 0°, with respect to the first layer, but not necessarily in that order. Other examples include composites with alternating layers rotated 90° with respect to each other.

One technique for forming a laminate includes the steps of arranging coated fibers into a desired network structure, and then consolidating and heat setting the overall structure to cause the matrix material to flow and occupy the remaining void spaces. Another technique is to arrange layers or other structures of coated or uncoated fiber adjacent to and between various forms, e.g. films, of the matrix material and then to consolidate and heat set the overall structure. In the above cases, it is possible that the matrix can be caused to stick or flow without completely melting. In general, if the matrix material is caused to melt, relatively little pressure is required to form the composite; while if the matrix material is only heated to a sticking point, generally more pressure is required. Also, the pressure and time to set the composite and to achieve optimal properties will generally depend on the nature of the matrix material (chemical composition as well as molecular weight) and processing temperature.

The simple elastomeric matrix composites are incorporated into complex composites to provide a rigid complex composite article suitable, for example, as structural ballistic-resistant components, such as helmets, structural members of aircraft, and vehicle panels.

The term "rigid" as used in the present specification and claims, is intended to include semi-flexible and semi-rigid structures that are capable of being free standing, without collapsing. To form the complex composite, at least one substantially rigid layer is bonded or otherwise connected to a major surface of the simple composite. The resultant complex composite article is capable of standing by itself and is impact resistant. Where there is only one layer, the simple composite ordinarily forms a remote portion of the composite article; that is a portion that is not initially exposed to the environment, e.g., the impact of an oncoming projectile. Where there is more than one layer, the simple composite may form, for example, a core portion that is sandwiched between two layers, as is particularly useful, for example, in helmet applications. Other forms of the complex composite are also suitable, for example a composite comprising multiple alternating layers of simple composite and rigid layer.

The rigid layers are preferably comprised of an impact resistant material, such as steel plate, composite armor plate, ceramic reinforced metallic composite, and high strength fiber composites (for example, an aramid fiber and a high modulus, resin matrix such as epoxy or phenolic resin vinyl ester, unsaturated polyester, thermoplastics, Nylon ® 6, nylon 6, 6 and polyvinylidine halides.) Most preferably, the rigid impact resistant layer is one which is ballistically effective. A desirable embodiment of our invention is the use of a rigid impact resistant layer which will at least partially deform the initial impact surface of the projectile or cause the projectile to shatter such as aluminum oxide, boron carbide, silicon carbide and beryllium oxide (see Laible, supra, Chapters 5-7 for additional useful rigid layers). For example, a particularly useful ballistic resistant complex composite comprises a simple composite comprising highly-oriented ultra-high molecular weight polyethylene fiber in an elastomeric matrix on which is formed at least one layer comprising highly-orientated ultra-high molecular weight polyethylene fiber in a rigid matrix, such as an epoxy resin. Other suitable materials for the face sheets include materials which may be heat resistant, flame resistant, solvent resistant, radiation resistant, or combinations thereof such as stainless steel, copper, aluminum oxides, titanium, etc.

As a portion of the rigid impact resistant composite, the volume percent of the simple composite is variable depending upon the desired properties of the final product. The volume percent of the simple composite to the complex composite is ordinarily at least about 10%, preferably at least 30%, and most preferably at least about 60% (for maximizing ballistic resistance). The examples illustrate the effectiveness of a simple composite in a complex structure at various percentages of the simple composite to the total. For example, various compromises between structural rigidity and ballistic performance are attainable depending upon the specific material choices and the relative properties of the simple composites and rigid layers.

Studies of ballistic composites employ a 22 caliber, non-deforming steel fragment of specified weight, hardness and dimensions (Mil-Spec. MIL-P-46593A(ORD)). The protective power of a structure is normally expressed by citing the impacting velocity at which 50% of the projectiles are stopped, and is designated the $V_{50}$ value.

Usually, a composite armor has the geometrical shape of a shell or plate. The specific weight of the shells and plates can be expressed in terms of the areal density. This areal density corresponds to the weight per unit area of the structure. In the case of fiber reinforced composites, the ballistic resistance of which depends mostly on the fiber, another useful weight characteristic is the fiber areal density of composites. This term corresponds to the weight of the fiber reinforcement per unit area of the composite.

The following examples are presented to provide a more complete understanding of the invention. The specific techniques, conditions, materials, proportions and reported data set forth to illustrate the principles of the invention are exemplary and should not be construed as limiting the scope of the invention.

EXAMPLE 1

A ballistic target was prepared by consolidation of a plurality of sheets comprised of unidirectional, high strength, extended chain polyethylene (ECPE) yarn impregnated with a thermoplastic elastomer matrix. The target was produced from yarn, Yarn 1, processed in accordance with Precursor Preparation Method 1 and Molding Procedure 1.

Yarn 1: This yarn had a yarn tenacity of approximately 29.5 g/denier, a modulus of approximately 1250 g/denier, an energy-to-break of approximately 55 Joules/g, a yarn denier of approximately 1200 and an individual filament denier of approximately 10 (118 filament, untwisted yarn).

Precursor Preparation Method 1: Thermoplastic elastomer impregnated sheets were prepared in the following manner:

Yarn 1 was pulled simultaneously from two spools and the two yarn strands passed around a smooth guide immersed in a beaker that contained a solution of thermoplastic elastomer in a volatile solvent. The coated yarns were helically wrapped in a closely positioned, side-by-side arrangement around a one foot diameter rotating drum while the immersed roller and beaker were traversed along the length of the drum. After traversing the length of the drum and the two strands of yarn were cut and the drum was rotated until the solvent had evaporated. The drum was stopped and the prepreg was cut along the length of the drum and then peeeled off to yield a sheet having fiber areal density of 0.148 kg/m$^2$ and weight % fiber of 72.7%. The resultant thin prepreg sheet was comprised of a plurality of substantially parallel strands of coated yarn aligned along a common direction.

The thermoplastic elastomer employed was Kraton D1107, a commercial product of the Shell Chemical Company. This elastomer is a triblock copolymer of the polystyrene-polyisoprene-polystyrene having about 14 weight % styrene. The coating solution was comprised of about 70g of rubber (elastomer) per litre of dichloromethane solvent.

Molding Procedure 1: In this molding procedure the prepreg was cut into a plurality of square sheets having sides 30.5 cm (one ft.) in length. These squares were stacked together with the fiber length direction in each prepreg sheet perpendicular to the fiber length in adjacent sheets. A thin square of aluminum foil was placed over the top and under the bottom of the stacked prepreg sheets. Two Apollo plates (0.05 cm thick chrome coated steel plates) coated with a general purpose mold release were used to sandwich the sample after a thermocouple probe was inserted approximately 2 cm from the corner of the sample between the two middle prepreg sheet layers. This cold assembly was placed between two platens of a hydraulic press and subjected to a temperature of approximately 130° C. and a pressure of approximately 552 kPa (80 psi). Five minutes after the thermocouple indicated a temperature of 120° C., water coolant was passed through the platen. Pressure was released when the sample temperature was less than 50° C.

EXAMPLE 2

Two layers of 2×2 basket weave Kevlar ® 29 fabric of areal density of 0.4515 kg/m$^2$ were coated with a general purpose epoxy resin based on the reaction product of Bisphenol A and epichlorohydrin (Epon ® 828 resin with Cure Agent ® A, diethylaminopropylamine, in the weight ratio of 100 to 6, both of which are commercial products of Shell Chemical Company). The two layers were plied together and molded between two mold release coated Apollo plates in a hydraulic press at 60 psi ($\approx$41 kPa) at 105° C. for 90 minutes.

Prepreg sheets were prepared according to Precursor Preparation Method 1 and were stacked together in an identical manner to that used in Example 1, except that they were laid onto the cured rigid facing. This assembly was then molded in a similar manner to that used in Example 1 to produce a 6 inch (15.2 cm) square ballistic target with a rigid facing on one side.

EXAMPLE 3

A ballistic target was prepared in a similar manner to Example 2 except that two rigid facings were utilized, each containing high modulus polyethylene fabric reinforcement. Each facing contained two layers of a plain weave fabric prepared from untwisted Yarn 1.

EXAMPLE 4

Another ballistic target was prepared in an identical manner to that of Example 2, except that the facing resin was a polyvinylbutyral modified phenolic resin supplied by Gentex Corporation.

EXAMPLE 5

Data given in Table 1 compares a simple composite (Example 1) with complex composites (Examples 2-4) formed from the simple composite system of Example 1. The composites of Examples 2-4 have rigid facings on at least the initial impact side of the complex composite. It should be noted that the simple ballistic composite is more effective than known rigid ballistic composites of substantially the same areal density.

To compare structures having different $V_{50}$ values and different areal densities, this example state the ratios of (a) the kinetic energy (Joules) of the projectile at the $V_{50}$ velocity, to (b) the areal density of the fiber or of the composite (kg/m$^2$). These ratios are designated as the Specific Energy Absorption of fiber (SEA) and Specific Energy Absorption of Composite (SEAC), respectively.

TABLE 1

| Ballistic Performance of A-900 Elastomeric Composites With and Without Rigid Facings | | | | |
|---|---|---|---|---|
| Example | 1 | 2 | 3 | 4 |
| CORE | | | | |
| ECPE Fiber AD | 6.20 | 5.11 | 4.74 | 5.10 |
| Total Core AD | 8.53 | 6.43 | 5.92 | 6.60 |
| FACINGS | | | | |
| Number | None | 1 | 2 | 1 |

TABLE 1-continued
Ballistic Performance of A-900 Elastomeric Composites With and Without Rigid Facings

| Example | 1 | 2 | 3 | 4 |
|---|---|---|---|---|
| Fabric (plain weave) | None | Kevlar ® 29 | ECPE | Kevlar ® 29 |
| Resin | None | Epoxy | Epoxy | Phenolic |
| Fabric AD | 0 | 0.903 | 1.30 | 0.903 |
| Facing AD | 0 | 1.29 | 2.07 | 1.29 |
| TOTAL COMPOSITE | | | | |
| FIBER AD | 6.20 | 6.01 | 6.04 | 6.00 |
| COMPOSITE AD | 8.53 | 7.72 | 7.99 | 7.89 |
| $V_{50}$ (ft/sec) | 2151 | 2078 | 2118 | >2189* |
| SEA | 38.2 | 36.1 | 38.0 | >40.9 |
| SEAC | 27.8 | 28.6 | 28.7 | >31.1 |
| Overall Wt % of ECPE Fiber in Core | 72.6 | 77.8 | 75.6 | 76.0 |
| Overall Wt % of Core ECPE in Composite | 72.6 | 66.0 | 59.3 | 64.5 |

Core matrix—Kraton D 1107 thermoplastic elastomer
AD—areal density in kg/m$^2$
SEA—specific energy absorption in Jm$^2$/kg of fiber
SEAC—specific energy absorption in Jm$^2$/kg of composite
*$V_{50}$ not established. Sample was destroyed without a complete penetration. Calculations were carried out using the highest fragment velocity tested (a partial penetration).

In each instance, the complex composites are ballistically as or more effective than the simple composite. The SEAC, based on total composite areal densities, is at least as high for each complex composite as for the simple composite consisting of ECPE fiber in the low modulus, thermoplastic elastomer. Unexpectedly, however, the wt % of core ECPE in the complex composites is significantly reduced as compared to the core ECPE in the simple composite.

EXAMPLE 6

For comparision purposes, a composite, identical in structure to the facings of Example 3, was prepared in an identical manner to the facings therein to produce a composite and fiber areal density of 7.96 and 5.90 kg/m$^2$, respectively. $V_{50}$ value was determined in the usual manner and found to be 1649 ft/sec, corresponding to a SEA of 23.5 Jm$^2$/kg. From this example, it is quite clear that the complex composites of our invention are significantly more effective in ballistic applications than simple rigid composites.

EXAMPLE 7

Samples were cut from ballistic resistant composite Example 1 and Example 3. Their flexural rigidity was compared using a three point flexing test using an Instron testing machine (5 in span, 0.2 in/min crosshead rate). The ratio of deflection under a loading force, λ, to a loading force, P, λ/P in the initial part of the Instron diagram, and apparent flexural modulus ($E_a$) of each composite are shown in Table 2. (Deflection, λ, is measured under the loading force P).

TABLE 2

| Ex. | Thickness (in) | Width (in) | Length (in) | λ/P | $E_a$ (psi) | SEA |
|---|---|---|---|---|---|---|
| 3 | 0.39 | 0.85 | 6 | 0.024 | 26,000 | 38.0 |
| 1 | 0.36 | 1.08 | 6 | 0.2 | 3,000 | 38.2 |

The apparent flexural modulus ($E_a$) is calculated using the formula:

$$E_a = \frac{PL^3}{4bh^3 \lambda}$$

where L is the sample length, b is the sample width, and h is the sample thickness. (Although we ignored the contribution of shear, an objective comparison of the relative rigidities of these samples can be made taking into account variations in the sample size).

This example shows that a complex composite of our invention (Example 3) having the same composition is about 8.7 times more rigid than a simple composite (Example 1) from which it is made, and that it provides similar ballistic performance at a lower percentage of fiber in the core (simple composite). Also, the SEA of Example 3 of 38.0 Jm$^2$/kg is significantly greater than the value of 35.0 Jm$^2$/kg calculated from the ballistic results obtained for Examples 1 and 5 utilizing the Rule of Mixture.

EXAMPLE 8

Shore Durometer Hardness Type D measurements are taken in accordance with ASTM Procedure D-2240 for Examples 1-4 and for three simple composite samples (A-C employing different matrix materials. Examples A-C were produced by procedures described in examples 14, 15, and 17 of U.S. patent application Ser. No. 691,048, Harpell et al, filed Jan. 14, 1985, and commonly assigned (the procedures are summarized in footnotes 1-3 in Table 3 hereinbelow. The results of the test (and the SEA of each sample) are given in Table 3 below.

TABLE 3

| Sample | Durometer reading | SEA Jm$^2$/kg |
|---|---|---|
| Example 1 | 40.0 | 38.2 |
| Example 2 | 71.5 | 38.0 |
| Example 3 | 80.0 | 36.7 |
| Example 4 | 76.0 | 40.9 |
| A[1] | 38.2 | 32.0 |
| B[2] | 63.6 | 30.4 |
| C[3] | 71.5 | 29.9 |

[1]Sample A was prepared according to Precursor Preparation Method 1 (described above), except the coating consisted of a solution of polycaprotactone in dichloromethane [53 g. (PCL-700, Union Carbide)/L]. Molding Procedure 1 (described above) was used, except LDPE film was substituted for the aluminum foil and molding occured at 3.5 mPa to a temperature of 125° C., then doubled to 7 mPa for 5 minutes.
[2]Sample B was prepared according to Precursor Preparation Method 1, except the coating consisted of a solution of LDPE in toluene (67 g/L) held at 80° C. Molding Procedure 1 was employed, except that LDPE film was substituted for the foil and molding occured using a hydraulic press at 7.5 mPa (1000 psi) for a time until the molding temperature reached 125° C., and for 10 minutes thereafter followed by cooling of the press with water.
[3]Sample C was prepared according to Precursor Preparation Method 1, except the coating was 400 g Epon 828, 24.3 ml diethyleminopropylamine/liter dichloromethane, and a release paper was used to cover the rotating dram. Molding was carried out as for Sample B, except the mold temperature was 110° C. for 90 minutes at a pressure of 7665 kPa (110 psi).

From Table 3, it is apparent that simple composites employing non-elastomeric matrixes (samples A-C) exhibit decreased utility as ballistic resistant composites with increasing hardness of the matrix. When an elastomeric material is employed to form a simple composite (Example 1), hardness is low but ballistic resistance increases dramatically. With our invention (Examples 2-4), we are able to provide a high degree of hardness while at least maintaining the ballistic performance associated with the elastomeric matrix simple composite.

We claim:

1. A composite article of manufacture comprising:
   (a) fiber having a tensile modulus of at least about 160 g/denier and a tenacity of at least about 7 g/denier;
   (b) a material substantially coating said fiber and consisting essentially of an elastomer which has a tensile modulus (measured at about 23° C.) of less than about 6,000 psi (414 MPa); and
   (c) at least one rigid material arranged with said fiber coated with said elastomer to form a rigid composite article.

2. An article as recited in claim 1 wherein said fiber comprises a plurality of fibers each having a tensile modulus of at least about 160 g/denier and a tenacity of at least about 7 g/denier.

3. An article as recited in claim 1 wherein said fiber comprises a plurality of filaments.

4. An article as recited in claim 3 wherein each filament of fiber is substantially coated with said elastomer.

5. An article as recited in claim 1 further comprising a matrix material comprising an elastomeric material which has a tensile modulus (measured at about 23° C.) of less than about 6,000 psi (414 mPa) combined with said fiber substantially coated with said elastomer to form a simple composite.

6. An article as recited in claim 5 wherein said matrix material and said elastomer are the same material.

7. An article as recited in claim 1 further comprising a matrix material combined with said fiber substantially coated with said elastomer to form a simple composite.

8. An article as recited in claim 5 wherein said at least one rigid material is arranged as a layer on a major surface of said simple composite.

9. An article as recited in claim 1 wherein said at least one rigid material is arranged as a layer on a major surface of said fiber coated with said elastomer.

10. A article as recited in claim 1 wherein said fiber is a sheet-like array of fibers.

11. An article as recited in claim 1 wherein said fiber is a non-woven but regular pattern of fibers.

12. An article as recited in claim 1 wherein the volume fraction of fiber in said elastomer is at least about 0.3.

13. An article as recited in claim 1 wherein the volume fraction of fiber in said elastomer is at least about 0.5.

14. An article as recited in claim 1 wherein the volume fraction of fiber in said elastomer is at least about 0.75.

15. An article as recited in claim 1 wherein said elastomer has a glass transition temperature of less than about 0° C.

16. An article as recited in claim 1 wherein said elastomer has a glass transition temperature of less than about −40° C.

17. An article as recited in claim 1 wherein said elastomeric material has a tensile modulus of less than about 5,000 psi.

18. An article as recited in claim 1 wherein said elastomeric material has a tensile modulus of less than about 2500 psi.

19. An article as recited in claim 1 wherein said fiber is high molecular weight fiber having a tensile modulus of at least about 500 g/denier and a tenacity of at least about 15 g/denier.

20. An article as recited in claim 1 wherein said fiber is selected from the group consisting of: polypropylene fiber having a weight average molecular weight of at least about 750,000, a modulus of at least about 200 g/denier and a tenacity of at least about 11 g/denier; polyethylene fiber having a weight average molecular weight of at least about 500,000, a modulus of at least about 500 g/denier and a tenacity of at least about 15 g/denier; aramid fiber having a modulus of at least about 500 g/denier and a tenacity of at least about 18 g/denier, high molecular weight polyvinyl alcohol fiber having a weight average molecular weight of at least about 750,000, a modulus of at least about 200 g/denier and a tenacity of at least about 10 g/denier; and, combinations thereof.

21. An article as recited in claim 1 wherein said simple composite is a sheet material to which is laminated at least one additional simple composite sheet material.

22. An article as recited in claim 1 wherein the fiber comprises yarn.

23. An article as recited in claim 15 wherein the yarn is arranged to form a fabric.

24. An article as recited in claim 1 wherein said fiber is arranged to form a woven fabric.

25. An article as recited in claim 1 wherein said plurality of fibers in the matrix forms a sheet-like material on which at least two additional layers are provided, at least one additional layer being provided on each side of said sheet-like material.

26. A ballistic resistant composite article of manufacture comprising:
   (a) a fiber having a tensile modulus of at least about 200 g/denier and a tenacity of at least about 10 g/denier;
   (b) a material substantially coating each filament of said fiber and consisting essentially of an elastomer which has a tensile modulus (measured at about 23° C.) of less that about 6,000 psi (414 MPa); and
   (c) at least one rigid material arranged with said fiber substantially coated with said material to form a rigid composite article.

27. An article as recited in claim 26, wherein said fiber is high molecular weight fiber having a tensile modulus of at least about 500 g/denier and a tenacity of at least about 15 g/denier.

28. An article as recited in claim 26 wherein said fiber is arranged as a sheet-like array of fibers.
in claim 26 wherein the 29. An article as recited in claim 26 wherein volume fraction of fiber material comprising an elastomeric material is at least about 0.5.

30. An article as recited in claim 26 wherein said elastomeric material has a glass transition temperature of less than about −40° C.

31. An article as recited in claim 26 wherein said elastomeric material has a tensile modulus of less than about 2500 psi.

32. An article as recited in claim 19 wherein said fiber is selected from the group consisting of polypropylene fiber having a weight average molecular weight of at least about 750,000, polyethylene fiber having a molecular weight of at least about 500,000 and a tenacity of at least about 15 g/denier, aramid fiber having a modulus of at least about 500 g/denier and a tenacity of at least about 18 g/denier, high molecular weight polyvinyl alcohol fibers having a weight average molecular weight of at least about 750,000, and combinations thereof.

33. An article as recited in claim 27 wherein said at least one rigid material comprises highly oriented ultra-high molecular weight polyethylene fiber in a rigid matrix material.

34. Armor plate comprising the ballistic resistant article of claim 32.

35. A helmet comprising the ballistic resistant article of claim 32.

* * * * *